Jan. 15, 1963  M. G. SCHAEFFER  3,074,004
VOLTAGE REGULATOR FOR GENERATORS
Filed June 25, 1959

INVENTOR.
Marvin G. Schaeffer
BY
C. R. Meland
His Attorney 3,074,004
VOLTAGE REGULATOR FOR GENERATORS
Marvin G. Schaeffer, Farmington, Mich., assignor to General Motors Corporation, Detroit, Mich., a corporation of Delaware
Filed June 25, 1959, Ser. No. 822,881
1 Claim. (Cl. 322—77)

This invention relates to voltage regulating circuits for power supplies such as the generator in a motor vehicle electrical system.

In past voltage regulating circuits, it has been common practice to employ regulating relays of the electromagnetic-vibratory type or of the carbon pile type for controlling the voltage output of a generator or the like. Although these regulators have generally been effective in operation, they are susceptible to the burning and pitting of electrical contacts and have relatively slow response in that they employ moving parts.

It is, accordingly, an object of this invention to provide a voltage regulating circuit that includes no electrical contacts and no moving parts.

Another object of this invention is to provide a voltage regulating circuit that employs a plurality of constant voltage devices of the semi-conductor type, which are connected to provide a control signal that varies when the voltage impressed on the network of constant voltage devices varies.

Still another object of this invention is to provide a voltage regulating circuit that includes a network of two terminal, semi-conductor devices such as Zener diodes which are connected to provide a varying signal voltage as a function of voltage applied to the network.

A further object of this invention is to provide a generator regulating circuit that includes a network of constant voltage devices of the semi-conductor type which is operative to control the field current of the generator as a function of generator output voltage.

Another object of this invention is to provide a voltage regulating circuit for a generator having a main field winding and a differential field winding, there being a Zener diode connected across the main field winding for maintaining the voltage across it substantially constant while the current flow through the differential field winding varies in accordance with output voltage of the generator.

Further objects and advantages of the present invention will be apparent from the following description, reference being had to the accompanying drawings wherein preferred embodiments of the present invention are clearly shown.

Figure 1:
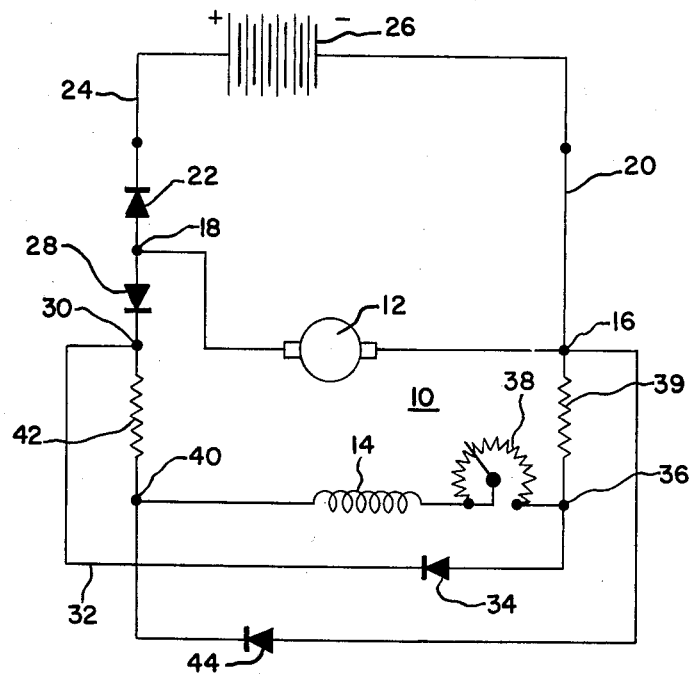
FIG. 1 is a circuit diagram illustrating a voltage regulating system made in accordance with this invention.

Referring now to the drawings and more particularly to FIG. 1, the voltage source to be controlled is generally designated by reference numeral 10 and takes the form of a direct current generator having an armature designated by reference numeral 12 and a field or control winding designated by reference numeral 14. The armature 12 has its output terminals connected, respectively, with junctions 16 and 18. The junction 16 is connected with a lead wire 20 which forms one of the power output leads while the junction 18 is connected to one side of a pn junction semi-conductor rectifier 22 of the silicon type. The opposite side of rectifier 22 is connected with a power conductor designated by reference numeral 24 and it is seen that the power conductors 20 and 24 are connected to a load circuit that includes a storage battery designated by reference numeral 26. The rectifier 22 has a very low forward voltage drop and is effective to prevent the battery from discharging through the power source. It is to be appreciated that the storage battery 26 forms a part of a motor vehicle electrical system as does the generator 10. It would also be appreciated that the generator 10 may supply direct current loads other than the storage battery 26.

The junction 18 is connected with a second pn junction semi-conductor rectifier 28 of the silicon type and the opposite side of this rectifier is connected with a junction 30. The junction 30 is connected with a lead wire 32 which in turn is connected to one side of a semi-conductor constant voltage device designated by reference numeral 34. The constant voltage device 34 is a Zener diode having the characteristic of preventing current flow in a reverse direction until the voltage impressed across the diode exceeds a predetermined value, whereupon the diode breaks down and operates as a constant voltage device. These diodes are well-known to those skilled in the art and are a pn junction semi-conductor device. The opposite side of Zener diode 34 is connected with a junction 36 and a resistor designated by reference numeral 38 is connected between junctions 16 and 36. The junction 36 is also connected to one side of a variable resistor or potentiometer designated by reference numeral 38. The potentiometer 38 is connected to one side of field winding 14 and it is seen that the opposite side of the field winding is connected with junction 40. A resistor 42 is connected between junctions 30 and 40 as is clearly apparent from FIG. 1. The junctions 40 and 16 are connected by a second Zener diode designated by reference numeral 44 having the same characteristic as Zener diode 34 in that it breaks down upon a predetermined reverse voltage and then acts as a constant voltage device.

The resistor 42 is a current limiting resistor for the Zener diode 44, whereas the resistor 38 is a current limiting resistor for the Zener diode 34. Resistors 38 and 42 have equal resistance valves and Zener diodes 34 and 44 have equal breakdown voltages.

The circuit of FIG. 1 operates to control the current flow through field winding 14 as a function of output voltage of the armature 12. Thus, in order to hold the output voltage of the generator 10 at a predetermined value, the circuit operates to reduce current flow through field winding 14 when the generator output voltage exceeds the desired value and operates to increase the field current when the generator voltage drops below the desired value. The circuit operates in this fashion by reason of the fact that the Zener diode 34 maintains a substantially constant voltage difference between junctions 30 and 36, whereas the Zener diode 44 maintains a substantially constant voltage difference between junctions 40 and 16. Thus it can be seen that if the output voltage of the generator increases, the potential of junction 40 will remain constant with respect to junction 16, but the potential of junction 36 will increase with respect to the potential of junction 16 to reduce the potential difference between junctions 40 and 36. This will cause the current flow through the field winding 14 to be reduced to thus cut back the output voltage of the generator.

If the output voltage of the generator falls below a desired value, the potential of junction 40 still remains constant, but the potential of junction 36 with respect to junction 40 decreases so that a greater current flow is realized through the field winding 14. This causes an increase in the output voltage of the generator to bring the voltage back up to the desired predetermined value. The voltage regulating point, of course, may be adjusted by adjustment of the potentiometer 38.

In the circuit of FIG. 1, the silicon diode 22 prevents reverse current flow from the battery towards the armature and field of the generator while permitting current flow from the armature towards the battery 26.

Figure 2:
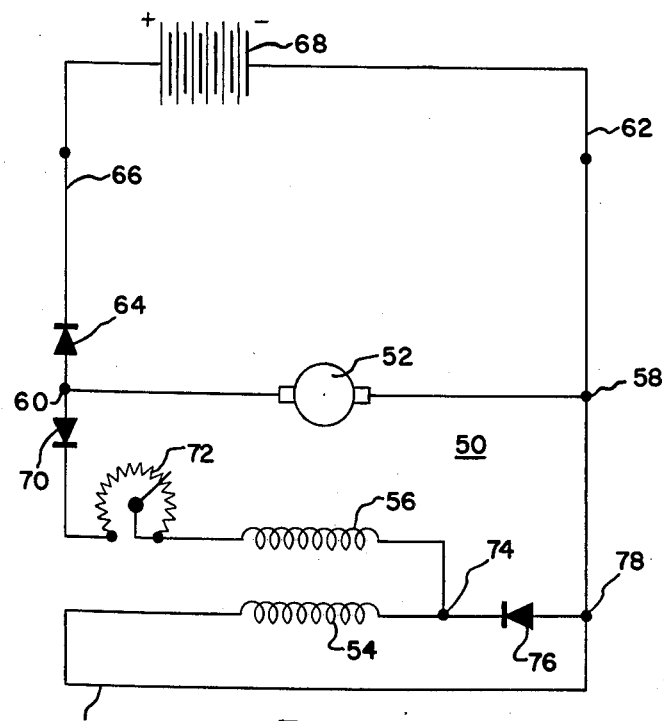
FIG. 2 is a schematic circuit diagram illustrating a modified voltage regulating circuit made in accordance with this invention.

Referring now to FIG. 2, it is seen that the power source comprises a direct current generator designated by reference numeral 50 and having an armature winding 52, a main field winding 54, and a differential field winding 56. The armature 52 of the generator has its output terminals connected with junctions 58 and 60, the junction 58 being connected with power lead 62. The junction 60 is connected to one side of silicon diode 64 which is of the same type as the diode 22 designated in FIG. 1. The opposite side of diode 64 is connected with a power lead 66 and the power leads 62 and 66 feed charging current to a storage battery designated by reference numeral 68. The storage battery 68 forms part of a direct current load of a motor vehicle as is well-known to those skilled in the art.

The junction 60 is connected to one side of a silicon diode 70 which has its opposite side connected to a potentiometer designated by reference numeral 72. The diode 70 is of the pn junction type having a low forward voltage drop. The potentiometer 72 is connected directly between differential field winding 56 and silicon diode 70. The opposite side of differential field winding 56 is connected with a junction 74. The junction 74 is connected to one side of main field winding 54 and to one side of a Zener diode 76 which is of the same type as Zener diodes 34 and 44 illustrated in FIG. 1. The opposite side of field winding 54 is connected with a junction 78 by a lead wire 80.

In the circuit of FIG. 2, the magnetic flux generated by field windings 54 and 56 is in opposition so that an increase of current through differential field winding 56 causes a reduction in the output voltage of the generator. It can be seen from FIG. 2 that the Zener diode 76 is connected across junctions 74 and 78 and thus is connected across the main field winding 54. When the diode 76 breaks down in a reverse direction, it operates as a constant voltage device to maintain the voltage across field winding 54 substantially constant. It thus is seen that when the output voltage of generator 50 increases, the current flow through field winding 56 is likewise increased to cause a reduction in output voltage of the generator. On the other hand, when the output voltage of generator 50 falls below a predetermined desired value, the field current through the differential field 56 is decreased, thus causing an increase in generator voltage. In this manner, the regulating circuit maintains the voltage of generator 50 at a substantially constant value for supplying charging current to the battery 68 and other D.C. loads that are used on motor vehicles.

The purpose of the silicon diode 28 in FIG. 1 and the silicon diode 70 illustrated in FIG. 2 is to prevent current flow through the field windings of the generator in a reverse direction should the generator for some reason change its polarity of output voltage.

Although a direct current generator has been illustrated as the power source that is regulated, it will be appreciated that this power source could take other forms, for example, it could be an A.C. generator that is fitted with rectifiers, the rectifiers supplying direct current to junctions 16 and 18 in FIG. 1 and junctions 58 and 60 in FIG. 2.

It will be apparent from the foregoing that a voltage regulating circuit has been provided which is completely free of moving contacts and moving parts. In addition, it is to be pointed out that with the use of Zener diodes in these regulator circuits, the peak loads from the generator are arrested and not transmitted to the lighting circuit, radio, and other accessories. This insures longer life for lamp bulbs, radio tubes and the like.

While the embodiments of the present invention as herein disclosed constitute preferred forms, it is to be understood that other forms might be adopted.

What is claimed is as follows:

In combination, a generator having output terminals and a field winding, a bridge network comprised of two resistors and two Zener diodes having equal voltage breakdown characteristics, said bridge network having input terminals and output terminals, a storage battery, a circuit connecting said generator with said storage battery including a first diode for preventing the battery from discharging through the generator, means connecting one of the input terminals of said bridge network to one side of said generator, means including a second diode connecting an opposite side of said generator with the other input terminal of said bridge network, and means connecting the field winding of said generator across the output terminals of said bridge network.

References Cited in the file of this patent

UNITED STATES PATENTS

| | | |
|---|---|---|
| 1,014,395 | Hull | Jan. 9, 1912 |
| 1,147,692 | Beetem | July 20, 1915 |
| 1,621,429 | Peterson | Mar. 15, 1927 |
| 2,773,233 | Marcks | Dec. 4, 1956 |
| 2,774,031 | Lamm | Dec. 11, 1956 |
| 2,809,301 | Short | Oct. 8, 1957 |
| 2,864,053 | Woodworth | Dec. 9, 1958 |
| 2,892,143 | Sommer | June 23, 1959 |
| 2,896,149 | Lowry et al. | July 21, 1959 |